US009612380B2

(12) United States Patent
Vinther (10) Patent No.: US 9,612,380 B2
(45) Date of Patent: *Apr. 4, 2017

(54) ILLUMINATION SYSTEM COMPRISING AN OPTICAL LIGHT MIXING ROD AND A PRESSURE MECHANISM TO APPLY A PRESSURE FORCE TO THE OPTICAL LIGHT MIXING ROD AND TO PRESS AN ENTRANCE SURFACE AND EMITTING WINDOW TOGETHER (71) Applicant: Martin Professional ApS, Aarhus N (DK)

(72) Inventor: Thomas Vinther, Beder (DK)

(73) Assignee: Martin Professional ApS, Aarhus N (DK)

( * ) Notice: Subject to any disclaimer, the term of this patent is extended or adjusted under 35 U.S.C. 154(b) by 76 days.

This patent is subject to a terminal disclaimer.

(21) Appl. No.: 14/549,168

(22) Filed: Nov. 20, 2014

(65) Prior Publication Data
US 2015/0138825 A1 May 21, 2015

(30) Foreign Application Priority Data

Nov. 21, 2013 (DK) .................................. 2013 70715

(51) Int. Cl.
*F21V 8/00* (2006.01)
*G02B 6/42* (2006.01)
*G02B 27/09* (2006.01)
(52) U.S. Cl.
CPC ......... *G02B 6/0001* (2013.01); *G02B 6/0008* (2013.01); *G02B 6/4201* (2013.01);
(Continued)

(58) Field of Classification Search
CPC .... G02B 6/4219; G02B 6/4228; G02B 6/423; G02B 6/4231; G02B 6/4292;
(Continued)

(56) References Cited

U.S. PATENT DOCUMENTS 5,271,079 A    12/1993  Levinson
5,692,083 A *  11/1997  Bennett ................ G02B 6/4292
                                                     385/88
(Continued)

FOREIGN PATENT DOCUMENTS

CN         1655052 A       8/2005
CN       201811092 U       4/2011
(Continued)

OTHER PUBLICATIONS

Machine Translation DE19961527 May 7, 2001.*
(Continued)

*Primary Examiner* — Robert May
(74) *Attorney, Agent, or Firm* — Brooks Kushman P.C.

(57) ABSTRACT

The present invention relates to an illumination system comprising at least one light source and an optical light mixing rod. The illumination system comprises a rod holder holding the optical light mixing rod in a position, where the entrance surface of the optical light mixing rod is arranged above the emitting window of the light source. The optical light mixing rod is from in a flexible and solid transparent material and the rod holder is adapted to provide a pressure force to the optical light mixing rod and the pressure force is adapted to press the entrance surface of the optical light mixing rod and the emitting window of the light source together. The optical light mixing rod comprises a bulge the entrance surface and the pressure force presses the bulge flat against the emitting window of the light source.

20 Claims, 7 Drawing Sheets

(52) U.S. Cl.
CPC ......... *G02B 6/4202* (2013.01); *G02B 6/4219* (2013.01); *G02B 6/4228* (2013.01); *G02B 6/4236* (2013.01); *G02B 6/4244* (2013.01); *G02B 6/4245* (2013.01); *G02B 27/0927* (2013.01); *G02B 27/0994* (2013.01); *Y10T 29/49002* (2015.01)

(58) Field of Classification Search
CPC .... G02B 6/4236; G02B 6/424; G02B 6/4242; G02B 6/4243; G02B 6/0001; F21Y 2101/02
USPC .......................................................... 362/581
See application file for complete search history.

(56) References Cited

U.S. PATENT DOCUMENTS

| | | | |
|---|---|---|---|
| 5,732,176 | A | 3/1998 | Savage, Jr. |
| 6,346,675 | B1 | 2/2002 | Igel et al. |
| 6,428,216 | B1* | 8/2002 | Savage, Jr. .......... G02B 6/4219 385/33 |
| 6,905,214 | B2* | 6/2005 | Tani .................... G03B 21/208 348/E9.027 |
| 7,455,440 | B2* | 11/2008 | Nishizawa ............... G08B 5/36 362/559 |
| 7,934,840 | B2* | 5/2011 | Hwang ................ G02B 6/0046 353/122 |
| 2002/0136027 | A1 | 9/2002 | Hansler et al. |
| 2004/0041984 | A1* | 3/2004 | Tani .................... F21V 29/763 353/20 |
| 2009/0232511 | A1* | 9/2009 | Deng ................... G02B 6/4292 398/142 |
| 2012/0287628 | A1 | 11/2012 | Markell |
| 2013/0215636 | A1 | 8/2013 | Angelini et al. |

FOREIGN PATENT DOCUMENTS

| | | |
|---|---|---|
| CN | 201983020 U | 9/2011 |
| CN | 102374416 A | 3/2012 |
| CN | 102472916 A | 5/2012 |
| CN | 102575822 A | 7/2012 |
| CN | 102981208 A | 3/2013 |
| DE | 19961527 A1 | 7/2001 |
| EP | 1367413 A1 | 12/2003 |
| EP | 2184818 A | 5/2010 |
| EP | 2431654 A2 | 3/2012 |
| JP | 2011243550 A | 12/2011 |
| WO | 2013098387 A2 | 7/2013 |

OTHER PUBLICATIONS

Denmark Search Report and Written Opinion for corresponding Appln. No. PA 2013 70715, mailed Jul. 7, 2014, 6 pages.
Chinese Office Action for Application No. 201410676196.6, mailed Apr. 25, 2016, 6 pages.
Chinese Office Action for Application No. 201410677173.9, mailed Apr. 25, 2016, 5 pages.
European Extended Search Report for Application No. 14194154.2, mailed Apr. 24, 2015, 5 pages.
European Extended Search Report for Application No. 14194149.2, mailed Apr. 24, 2015, 4 pages.

* cited by examiner

ILLUMINATION SYSTEM COMPRISING AN OPTICAL LIGHT MIXING ROD AND A PRESSURE MECHANISM TO APPLY A PRESSURE FORCE TO THE OPTICAL LIGHT MIXING ROD AND TO PRESS AN ENTRANCE SURFACE AND EMITTING WINDOW TOGETHER

CROSS-REFERENCE TO RELATED APPLICATIONS

This application claims priority to DK Application No. PA201370715, filed Nov. 21, 2013, the disclosure of which is incorporated in its entirety by reference herein.

TECHNICAL FIELD

The present invention relates to an illumination system comprising an optical light mixer providing a homogenized and uniform light beam where the optical light mixer is formed of a solid transparent material and light enters the optical light mixer through an entrance surface and is reflected through the optical light mixer to an exit surface where the light exits the optical light mixer.

BACKGROUND

In the lighting industry light mixing rods are widely used to collect light from a light source and mix the collected light into a light beam. The light from the light source enter the light mixing rod through an input end and propagates through the light mixing rod and is typically reflected at the sidewalls of the mixing rod one or more times. Due to the multiple reflections the result is that the light from the light sources is mixed and the light distribution at the output end of the light mixing rod is substantially uniform. Light rods are thus used to provide a substantially uniform light distribution from a light source having a non-uniform light distribution.

Further, light mixing rods are often used to mix light from a light source having a plurality of light emitters emitting different colored light, and where the purpose of the light mixing rod is to mix the light from the different light emitters into one uniform light beam with all colors equally mixed. For instance light mixing rods are widely used to mix light from 4 in 1 red, green, blue, white (RGBW) light emitting diodes (LEDs), which comprises a red LED die emitting red light, a green LED die emitting green light, a blue LED die emitting blue light and a white LED die (typical phosphor based) emitting white light.

Light mixing rods can have many different shapes as known in the prior art and are typically provided as a solid body of an optical transparent material where the light inside the light mixing rod undergo total internal reflection while propagating trough the light rod. The prior art solid light mixing rods are provide in PMMA or glass. Alternatively, the light mixing rods can also be provided as a hollow body with reflective surfaces for instance in metal or glass coated with reflective material, however these are relativity expensive to produce and ineffective due to loos of light at the reflections.

The known solid light mixing rods of PMMA or glass are arrange a distance above a light emitting window of the light sources in order not to scratch or in other ways destroy the light emitting window or the entrance surface. As a consequence, an air gab is introduced between the emitting window of the light source and the entrance surface of the solid light mixing rod, and the amount of light entering the light rod are reduced, due to the transmission from the light emitting window to air and due to the transmission form air to the light mixing rod. Further, some of the light from the light source will be emitted outside the entrance surface of the light rod and thus not enter the light rod. As a consequence, a substantially amount of light is lost.

It is known that the loss of light due to the change in refractive index caused by the air gab can be reduced by providing a refractive index matching material between the light emitting window of the light source and the entrance surface of the solid light mixing rod. However, this process adds significant cost to the manufacturing process as the refractive index matching material need to be provided manually. The process of providing the refractive material is difficult and persons performing the process must be very accurate as the light sources and light rods are small (less the 1 cm2). In addition there is risk that the index matching material flows away by time, as most proper and affordable index matching materials is formed as a gel.

WO 06049801 discloses an LED package with a mechanically decoupled optical element where to decoupled optical element is in optical contact with LED die via an air gap. WO 06049801 also discloses that the optical element is optically coupled to LED die via a thin optically conducting layer that is disposed within the air gap. Examples of materials suitable for the optically conducting layer include index matching oils, and other liquids or gels with similar optical properties.

WO12083957 discloses an optical light mixer providing a homogenized and uniform light beam where the optical light mixer is formed of a solid transparent material and light enters the optical light mixer through an entrance surface and is reflected through said body to an exit surface where said light exits said optical light mixer. The optical light mixer comprises a first part formed as a pyramid frustum where the top surface of the pyramid frustum forms the entrance surface and a second part formed as a cone frustum and where the bottom surface the cone frustum forms the exit surface. The present invention relates also to an illumination device comprising a number of light sources and such optical light mixer.

DE 199 61 527 A1 discloses a light fixture where a light emitting diode is arranged in a light housing and on a circuit board arranged. A light guide is arranged in the cover of the light fixture housing and the light guide is arranged above the light emitting diode when the cover is arranged to the light fixture housing. The light fixture housing is filled with a potting compound. In one embodiment, the light emitting diode is held above a circuit board on a flexible conductor strip. The light guide is non-elastic and causes the flexible conductor strip to bend towards the circuit board when the cover is attached to the light fixture housing. In another embodiment, the light guide is a permanently elastic light guide which is compressed against the light emitting diode, when the cover is arranged to the light fixture housing. There is a risk that air, potting compound or other materials will be arrange between the light emitting diode and the light guide when arranging the light guide above the light emitting diode. In addition, it is difficult to arrange the light guide in an accurate position above the light emitting diode.

SUMMARY

The object of the present invention is to solve the above described limitations related to the prior art and to provide an illumination system with a light mixing rod collecting light from a light source and with improved optical effect. This is achieved by an illumination system and method of providing an illumination system as the independent claims. The dependent claims describe possible embodiments of the present invention. The advantages, benefits and technical effects achieved by the illumination system and method according to the present invention are described in the detailed description of the invention.

DETAILED DESCRIPTION

The present invention is described in view of an illumination device comprising a number of LEDs that generate a light beam, however the person skilled in the art realizes that the present invention can be used in illumination devices using any kind of light source such as discharge lamps, OLEDs, PLEDs, plasma sources, halogen sources, fluorescent light sources, etc. and/or combinations thereof. It is to be understood that the illustrated embodiments are simplified and illustrate the principles of the present invention rather than showing an exact embodiment. The skilled person will thus understand that the present invention can be embodied in many different ways and also comprise further components in addition to the shown components.

Figure 1A:
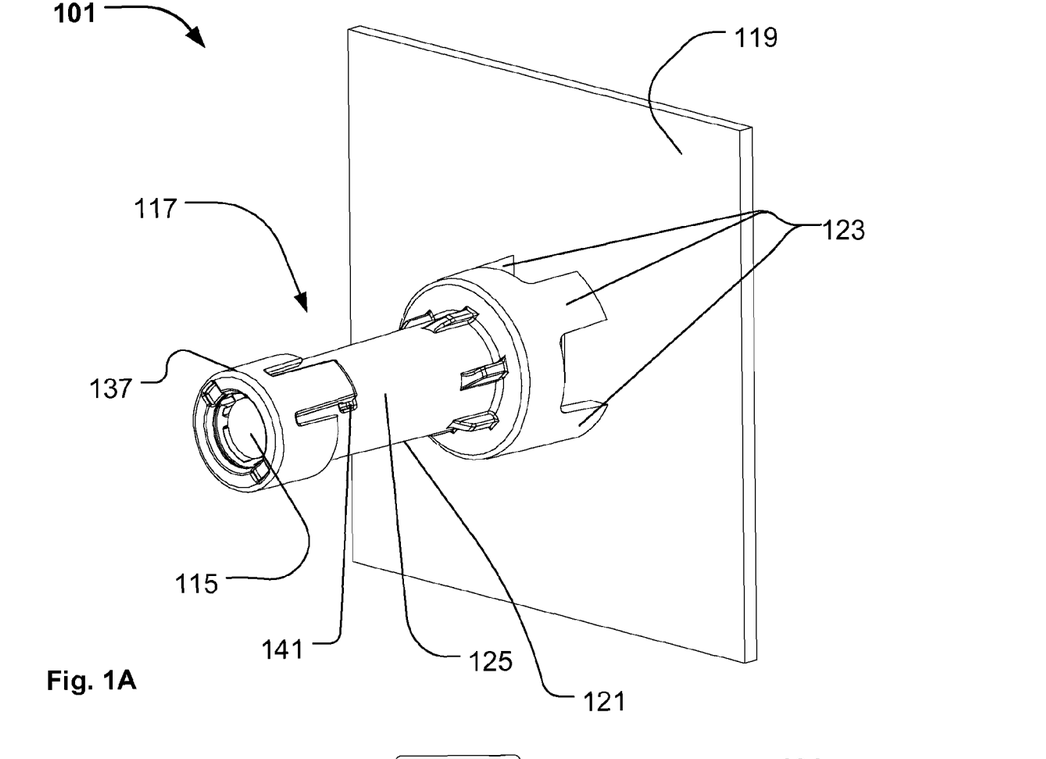
FIGS. 1A-1F illustrate an embodiment of an illumination system according to the present invention.
Figure 1B:
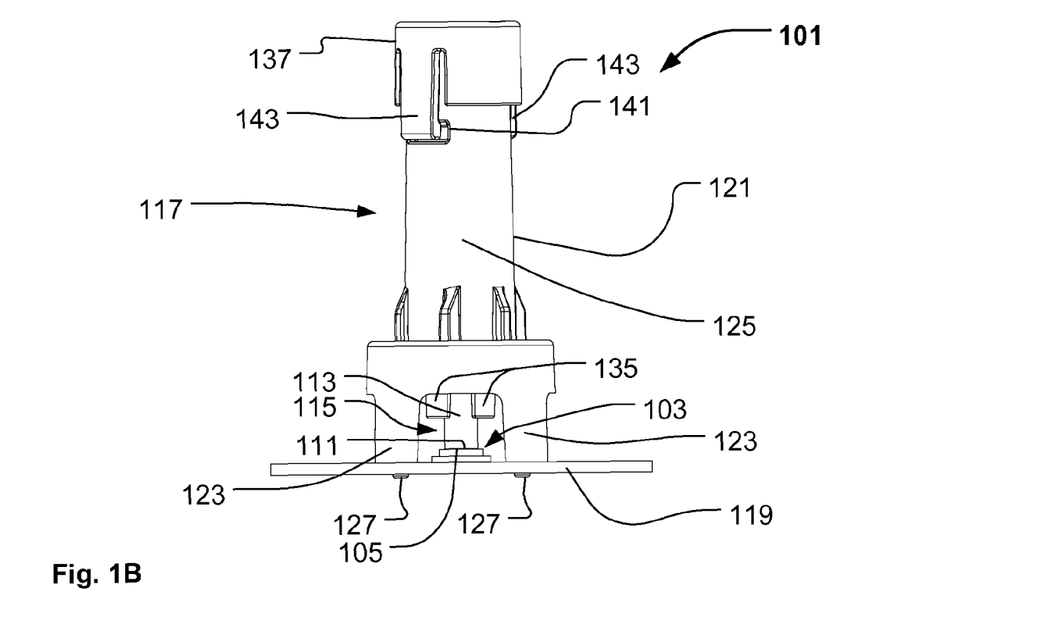
Figures 1C, 1D, 1E, 1F:
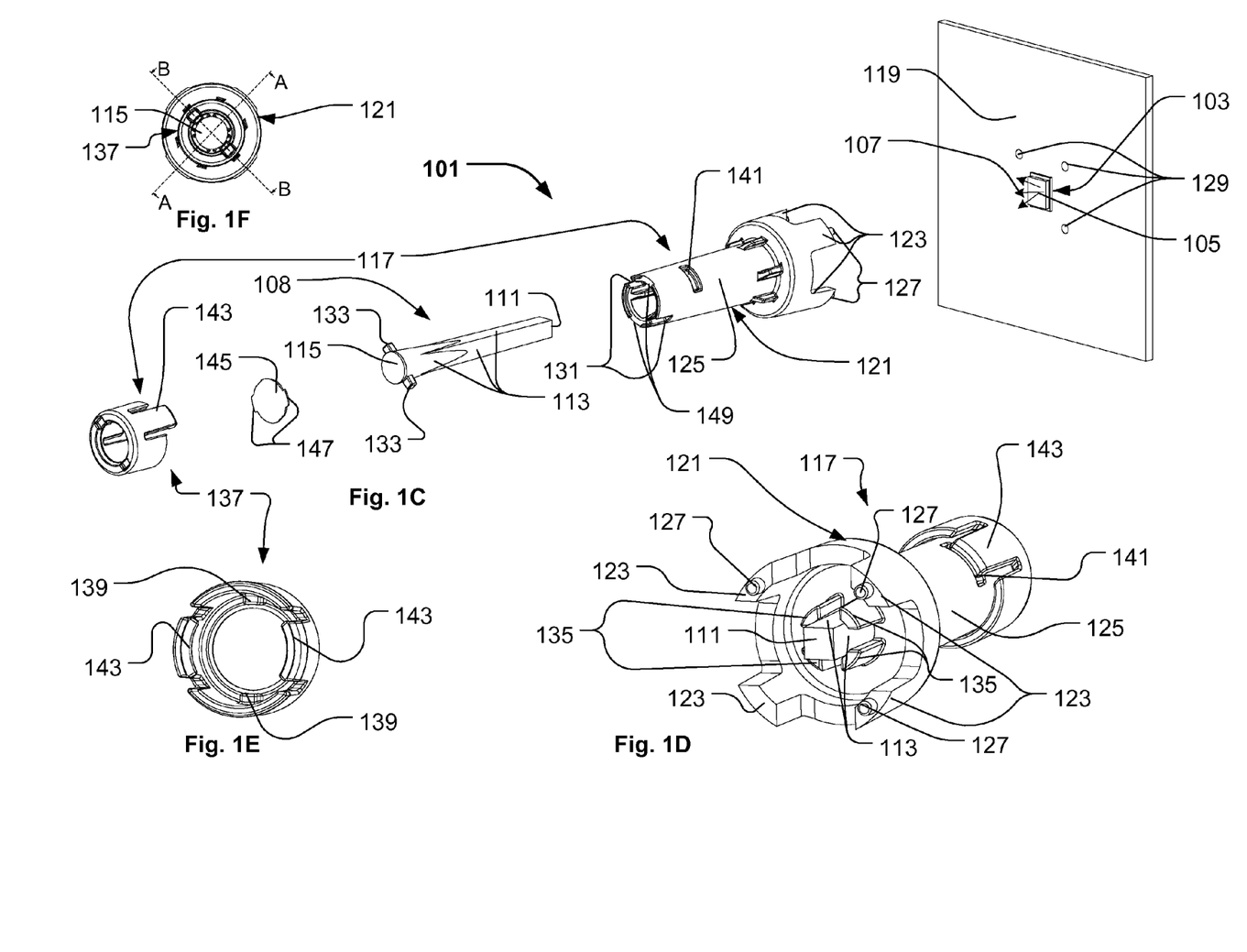

FIGS. 1A-1F illustrate an embodiment of the illumination system 101 according to the present invention, where FIG. 1A illustrates a perspective view, FIG. 1B illustrates a side view, FIG. 1C illustrates an exploded perspective view; FIG. 1D illustrates a bottom perspective view with the LED and LED PCB removed, FIG. 1E illustrates a bottom perspective view of the separate pressure part and FIG. 1F is a top view of the rod holder.

The illumination system 101 comprises at least one light source 103 emitting light from an emitting window 105 as illustrated by arrows 107. In the illustrated embodiment the light source is an 4 in 1 LED comprising a red LED die emitting red light, a green LED die emitting green light, a blue LED die emitting blue light and a white LED die emitting white light and the LED dies are covered by an emitting window 105 in order to protect the LED dies. However it is to be understood that any type of light source covered by an emitting window can be used.

An optical light mixing rod 108 comprising an entrance surface 111, side surfaces 113 and an exit surface 115 are arranged above the light emitting window 105 by a light rod holder 117. The light 107 from the light source enters the optical light mixing rod 108 through the entrance surface 111, is then transmitted through the optical light mixer via reflections at the side surfaces 113 and exits the optical light mixer through the exit surface 115. The optical light mixing rod can be embodied in many different ways as described in the prior art and can be optimized according to the light source and type of light beam that should be created. The illustrated optical light mixing rod just serves as an example of a possible optical light mixing rod. The optical light mixing rod is provided in a solid and flexible optical transparent material. The solid and flexible optical transparent material can be any solid optical transparent material which is flexible and which can be pressed against the emitting window without destroying the emitting window 105 and the entrance surface 111 of the optical light mixing rod. For instance, transparent silicone materials are suitable materials as silicone are softer than the glass material used in light emitting windows and silicone material can be provided in different hardness and it is thus possible to provide suitable solid flexible and optical transparent materials. Further, the silicone materials are heat resistance and can thus be arranged in physical contact with the heat generating light source. The rod holder comprises a pressure mechanism adapted to provide a pressure force to the optical light mixing rod and where the pressure force is adapted to press the entrance surface 111 and the emitting window 105 towards each other. The pressure force ensures that the entrance surface of the optical light mixing rod is pressed towards the emitting window and thereby avoiding, that air are introduced between the emitting window and the entrance surface whereby light loss is avoided due to changes in reflective index between the emitting window and the entrance surface. Providing the optical light mixing rod in a solid and flexible material makes it possible to arrange the optical light mixing rod in a tens state where the rod holder provides a pressing force to the optical light mixing rod. This ensures that the optical light mixing rod can be maintained in a position where the entrance surface is in physical contact with the emitting window even when the illumination system is handled in tough conditions. For instance, this is useful in connection with the entertainment industry where the illumination devices in connection with rigging and unrigging of stage equipment often experience hard physical handling. This is also useful in a moving head light fixtures where the illumination system according to the present invention is arranged in a head rotatable connected to a yoke rotatable connected to a base as optical light mixing rod can be maintained in correct position in relation to the light source when the head is rotated.

In one embodiment, the optical light mixer is embodied in a solid flexible and optical transparent material having a hardness that is less than 95 on the Shore A durometer scale. This ensures that the optical light mixer can be pressed against the emitting window without using too much force with the risk that the emitting window breaks. Further, a solid flexible and optical transparent material having a hardness of less than 95 on the Shore A durometer scale makes it possible to arrange the optical light mixing rod in a slightly tensed state.

In one embodiment, the optical light mixer is embodied in a solid flexible and optical transparent material having a hardness greater than 65 on the Shore A durometer scale. This ensures that the optical light mixing rod can be pressed against the emitting window and at the same time be maintained in substantially its original shape and not will be deformed even when the illumination are handled in though conditions. As a consequence, the optical properties of the optical light mixing rod can be maintained when above the light emitting window.

In one embodiment, the optical light mixer is embodied in a solid flexible and optical transparent material having hardness greater than 65 on the Shore A durometer scale and less than 95 the Shore A durometer scale and less than 95. In an embodiment the optical light mixing rod is embodied in silicone having a hardness of 70, 80 or 90 on the Shore A durometer scale.

In the illustrated embodiment, the light source 103 is arranged on a printed circuit board (PCB) 119 and the rod holder 117 comprises a rod support part 121 arranged at the PCB and near the light source. In the illustrated embodiment, the support part comprises a plurality of support legs 123 protruding from a central hollow part 125. The support legs are secured to the PCB through a peg 127 protruding from the bottom of the support legs, where the peg is adapted to be secured into an accommodating hole 129 in the PCB. In the illustrated embodiment the support part comprises four legs and only three of the legs comprises a peg this ensure that the support part only can be arranged in a certain way on the PCB board, which simplifies manufacturing. It is to be understood that any positive number of support legs can be provided and that in other embodiments the hollow part can be secured directly to the PCB. Further, it is to be understood that the support part 121 can be secured to the PCB in many different ways for instance using glue, screws, nails, rivets, velcro, snap mechanisms etc.

The rod support part 121 is adapted to accommodate and support the optical light mixing rod 108 in a position where at least a part of the entrance surface 111 of the optical light mixing rod 108 rests on the light emitting window 105 of the light source 103. The rod support part comprises thus support means adapted to support the optical light mixing rod 108 in the position above the light source. In the illustrated embodiment, the hollow part 125 acts as supporting means, where the upper end of the hollow part comprises two support recesses 131 adapted to engage with corresponding flanges 133 on the optical light mixing rod 108. The two flanges 133 are adapted to be inserted into the support recesses 131 when the optical light mixing rod is arranged inside the hollow part 125. Further, a plurality of support fingers 135 protrude from the lower part of the hollow part and are adapted to engage the lower part of the side surfaces 113 of the optical light mixing rod. The support fingers ensures the optical light mixing rod is maintained in optimal alignment when pressure (will be described below) is applied to the optical light mixing rod and thus prevent the optical light mixing rod to bend outward due to the applied pressure. However, it is noticed that a number of support and/or alignment features adapted to support the optical light mixing rod or to guide the optical light mixing rod in a correct position can be provided at the rod support part. The support and/or alignment features can for instance be embodied as protrusions, guide surfaces, guide/support fingers engaging with the sides of the optical light mixing rod. The rod holder 117 comprises a separate pressure part 137 adapted to engage with the rod support part 121 in a interlocked position and the separate pressure part 137 is in the interlocked position adapted to engage with at least a part of the optical light mixing rod and provide a pressure force to the optical light mixing rod. As described above, the pressure force is adapted to press the entrance surface 111 and the emitting window 105 towards each other. In the illustrated embodiment, the separate pressure part comprises two pressure knobs 139 adapted to provide pressure to flanges 133 of the optical light mixing rod when the separate pressure part interlocks with the rod support part. The separate pressure part is adapted to fit over the upper part of the support part 121, and the pressure knobs 139 are provided as internal protrusion and adapted to fit into the recesses 131 of the support part 121, when the separate pressure part interlocks with the rod support part. It is noted that any positive number of pressure knobs 139 can be provided.

The rod support part comprises a first engaging part and the separate pressure part comprises a second engaging part, where in the interlocked position the first engaging part is adapted to interlock with the second engaging part. In the illustrated embodiment, the first engaging part comprises two edges provided as snap recesses 141 at the side of the hollow part 125, and second engaging part comprises two snap fingers 143 each adapted to snap into one of the snap recesses 141. The separate pressure part 137 and rod support part 121 are interlocked when the snap fingers 143 snap into the snap recesses 141 and will in the interlocked arrangement provide pressure to the optical light mixing rod 108. The pressure knobs 139 will press the flanges 133 towards the light source, whereby the entrance surface is pressed towards the light emitting window. It is noticed that any positive number of snap fingers and snap recesses can be provided and that the snap recess also can be embodied as a recess formed all the way around the hollow part. Alternatively, a positive number of snap flanges protruding from the hollow part can be provided and the snap fingers can be adapted to snap the snap flanges. Also the snap principle can be reversed, meaning that the snap finger are arranged at the rod support and that snap edges are provided at the separate pressure part.

In the illustrated embodiment, an additional optical component 145 (only shown in FIG. 1C) is arranged above the exit surface 115 of the optical light mixing rod. In the illustrated embodiment, the additional optical component is provided as a substantially flat circular object comprising a positive number of aligning protrusions 147. The aligning protrusions 147 can be arranged in corresponding recess 149 at the top of the hollow part and can hereby be arranged above the exit surface of the optical light mixing rod. The aligning protrusions can be provided in an asymmetric pattern ensuring that the additional optical component only can be arranged above optical light mixing rod in a predefined way. The additional optical component can be any optical component adapted to provide optical effect the light exiting the optical light mixing rod for instance an optical diffuser, a beam shaper, color filter, gobo shapes etc.

Figures 2A, 2B:
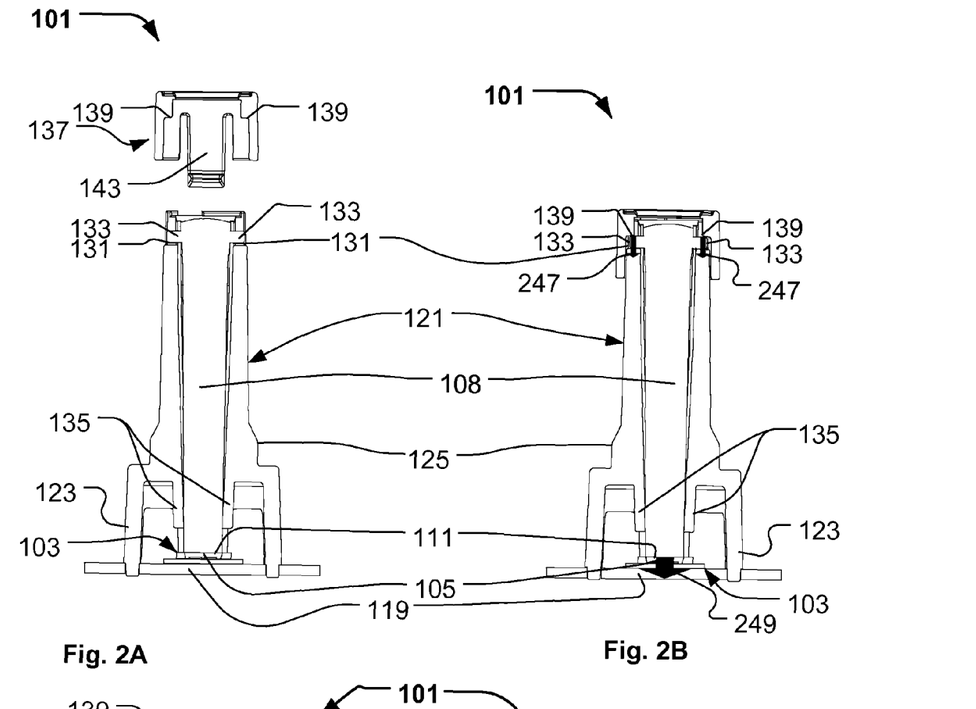
FIGS. 2A-2D illustrate cross sections of the illumination systems in FIG. 1A-1F and illustrate a method of providing such illumination system according to the present invention.
Figures 2C, 2D:
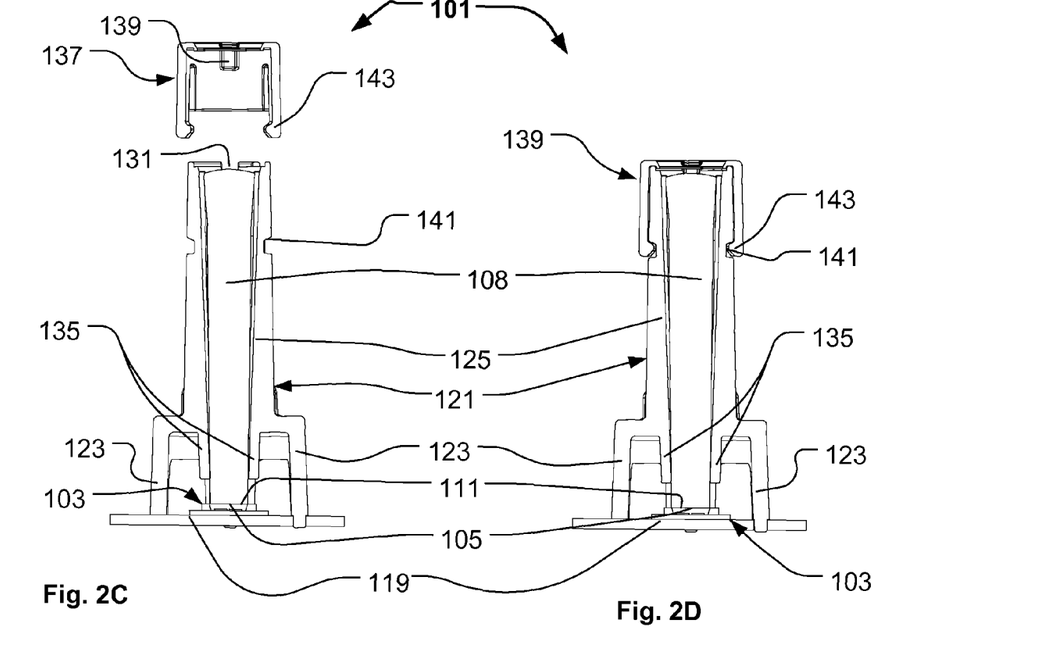

FIGS. 2A-2D illustrate cross sectional views of the illumination system of FIGS. 1A-1F. FIGS. 2A and 2B illustrate cross sectional views along line B-B in FIG. 1f, where FIG. 2A illustrates the illumination system 101 prior to arranging the separate pressure part 137 at the rod support part 121, and where FIG. 2B illustrates the illumination system when the separate pressure part 137 is arranged at and interlocks with the rod support part 121. FIGS. 2C and 2D illustrate a cross sectional views along line A-A in FIG. 1f, where FIG. 2C illustrates the illumination system 101 prior to arranging the separate pressure part 137 at the rod support part 121, and where FIG. 2D illustrates the illumination system when the separate pressure part 137 have been arranged at and interlocks with rod support part 121. The illumination system illustrated in FIGS. 2A-2D is identical with the illumination system illustrated in FIGS. 1A-1F and identical features are labeled with the same reference numbers and will not be described further. FIG. 2A-F serves also to illustrate the method of providing an illumination device according to the present invention.

FIG. 2A and FIG. 2C illustrate the illumination system prior to arranging the separate pressure part 137 at the support part 121. These figures illustrate the steps of providing at least one light source emitting light from an emitting window, which have been performed by arranging the light source 103 at the PCB 119. Further, the step of providing an optical light mixing rod have been performed and the optical light mixing rod have been arranged at the light source, such that light from the light source enters the optical light mixer through the entrance surface 111, is transmitted through the optical light mixer via reflections at the side surfaces and exits the optical light mixer through the exit surface 115. This has been achieved by arranging the support part 121 at the PCB 119 and around the light source and thereafter inserting the optical light mixing rod into the hollow part 125 of the support part 121 and such that the entrance surface 111 rests on the emitting window 105. In this arrangement, the optical light mixing rod is supported by the support fingers and flanges 133 are supported by the recesses 131 of the support part 121.

FIG. 2B and FIG. 2D illustrate the illumination system in the assembled configuration where the separate pressure part 137 is arranged at and interlocks with the support part 121. These figures illustrate the step of applying a pressure force to the optical light mixing rod, where the pressure force is adapted to press the entrance surface and the emitting window towards each other. In the illustrated embodiment, this is achieved by arranging the separate pressure part at the support part. During this step, the pressure knobs 139 are inserted into the support recesses 131 and are pushed downwards against the flanges 133, as the size of the pressure knobs have been designed such that the pressure knobs will get in contact with the flanges before the separate pressure part are in the final interlocked position. As a consequence, flange pressure forces (indicated by arrows 247) in FIG. 2B is provided to the flanges and these will be pushed towards the light sources. At least a part of the flange pressure forces 247 will, in the optical light mixing rod, be transferred into a pressure force (indicated by arrow 249) adapted to press the entrance surface towards the emitting window. A better contact between the light emitting window and the entrance surface will hereby be provided and as a consequence more light will enter the optical light mixing rod. Providing the optical light mixing rod in a solid and flexible optical transparent material ensures that the optical light mixing rod can be put in a tense state where the entrance surface is pressed against the light emitting window without destroying the light emitting window or the entrance surface.

A plurality of the illumination systems according to the present invention can for instance be implemented in the same illumination device and thereby form a common illumination or light beam. In such an illumination device, the light sources can be arranged on the same PCB board where the light rod support are arranged and attached to the PCB board.

Figures 3A, 3B:
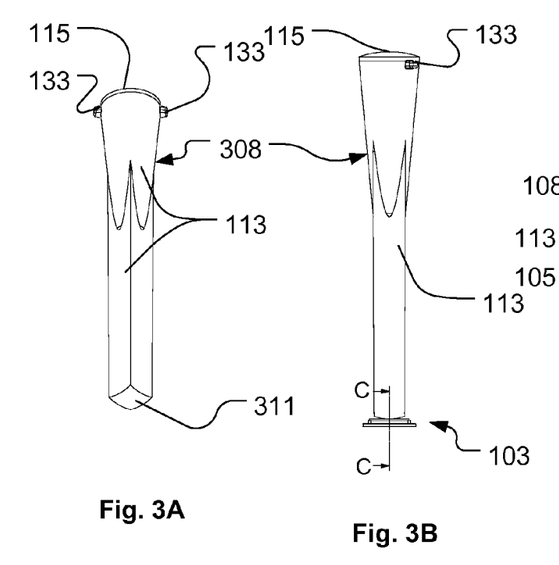
FIGS. 3A-3C illustrate an optical light mixing rod and illumination system according to the present invention.
Figure 3C:
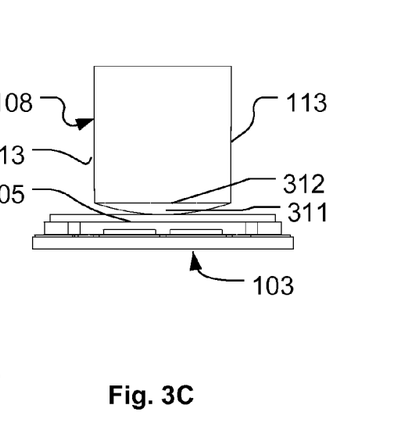

FIGS. 3A-3C illustrate another embodiment of an optical light mixing rod, which can be used in the illumination system according to the present invention. The optical light mixing rod 308 are substantially identical with the optical light mixing rod in the previous figures, and the substantially identical features are labeled with the same reference numbers and will not be described further. FIG. 3A illustrates a bottom perspective view of the optical light mixing rod, FIG. 3B illustrates the optical light mixing rod arranged above the light source and FIG. 3C is an enlarged cross sectional view along line C-C in FIG. 3b In this embodiment, the entrance surface 311 of the optical light mixing rod comprises at least one bulge having an increasing thickness compared to a flat entrance surface, where increasing thickness results in the fact that the size of the bulge is larger at least one point and that the thickness gradually increase towards this point. The bulge is formed as a smooth curve where the thickness of the bulge increases from the side surfaces 113 of the optical light mixing rod and towards the center of said entrance surface. This can be seen in FIG. 3C were the bulge compared to a flat entrance surface (illustrated by dotted line 312) is thickest at the center of the light rod. In the light mixing system according to the present invention, the pressure force is adapted to force the bulge flat against the emitting window. This will result in the fact that air and other material between entrance surface and the emitting window is pressed outward when the bulge is pressed against the emitting window, as the surface of the bulge is gradually pressed flat from the thickest part towards the thinnest part. As a consequence, a better contact between the entrance surface and the emitting window is achieved. This is possible due to the fact that the optical light mixing rod is provided in a solid flexible and optical transparent material.

Figures 4A, 4B:
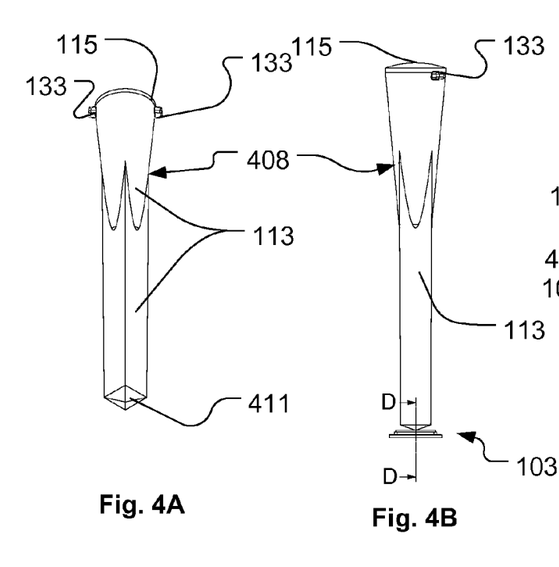
FIGS. 4A-4C illustrate another optical light mixing rod and illumination system according to the present invention.
Figure 4C:
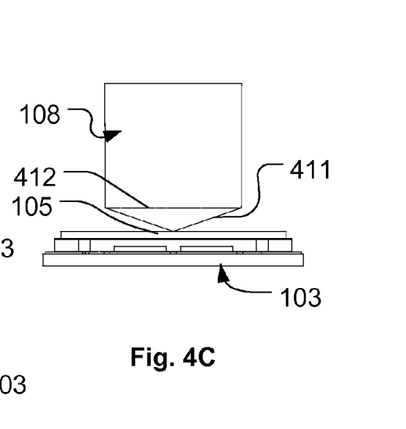

FIGS. 4A-4C illustrate another embodiment of an optical light mixing rod 408 which can be used in the illumination system according to the present invention. The optical light mixing rod 508 is substantially identical with the optical light mixing rod illustrated in the previous figures and the substantially identical features are labeled with the same reference numbers and will not be described further. FIG. 4A illustrates a bottom perspective view of the optical light mixing rod, FIG. 4B illustrates the optical light mixing rod arranged above the light source and FIG. 4C is an enlarge cross sectional view along line D-D in FIG. 4B.

In this embodiment, the bulged entrance surface 411 is formed as a pyramid with its bottom arranged at the corresponding flat entrance surface 412 (illustrated in dotted line) and with its top at the center of the entrance surface. As described in connection with FIGS. 3A-3C, the pressure force provided by the pressing mechanism of the light mixing system is adapted to force the bulge flat against the emitting window. This will result in the fact that air and other material between the entrance surface and the emitting window is pressed outward when the bulge is pressed against the emitting window, as the surface of the bulge gradually is pressed flat from the thickest part towards the thinnest part. As a consequence, a better contact between the entrance surface and the emitting window is achieved. This is possible due to the fact that the optical light mixing rod is provided in a solid flexible and optical transparent material.

Figures 5A, 5B, 5C:
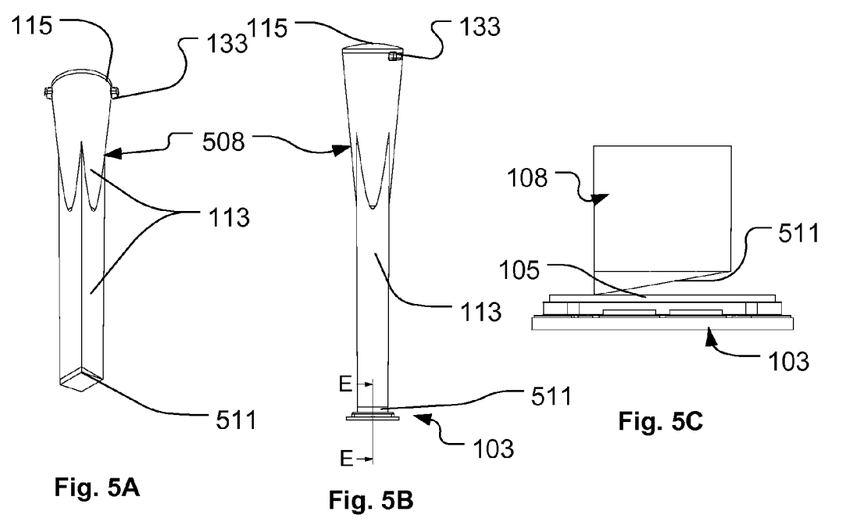
FIGS. 5A-5C illustrate another optical light mixing rod and illumination system according to the present invention.

FIG. 5A-5C illustrate another embodiment of an optical light mixing rod 508 which can be used in the illumination system according to the present invention. The optical light mixing rod 508 is substantially identical with the optical light mixing rod as depicted in FIGS. 3A-C and 4A-C except for the fact that the bulge in this embodiment is formed as a wedge. In this embodiment, air and other material between the entrance surface and the emitting window between the entrance surface and the emitting window will be pressed from one side of the optical light mixing rod to the opposite side and outwards, when the pressure force presses the bulge 511 flat against the emitting window.

Figures 6A, 6B:
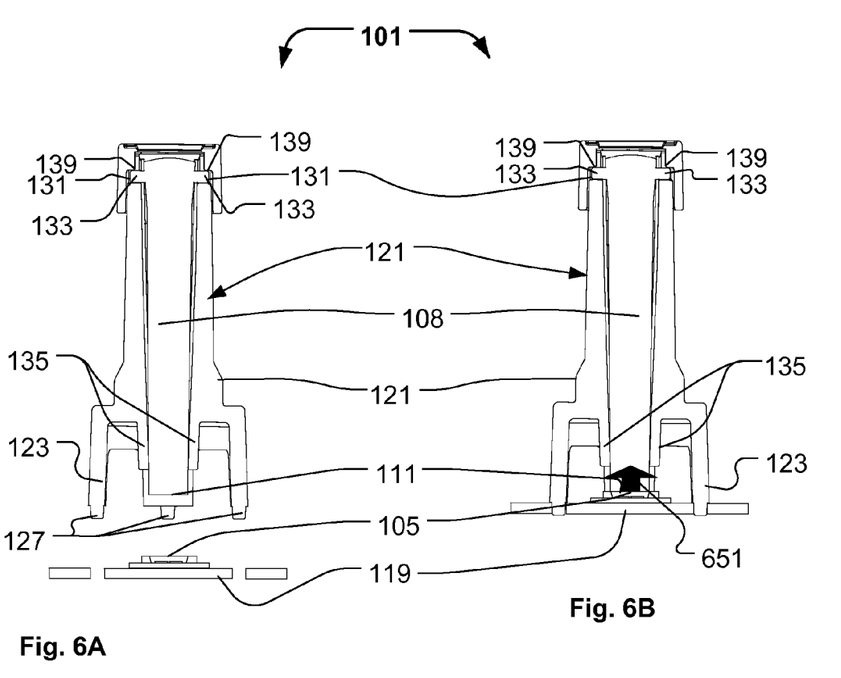
FIGS. 6A-6B illustrate cross sections views of another embodiment of an illumination system according to the present invention.

FIG. 6A and FIG. 6B illustrate cross sectional views along line B-B in FIG. 1F of the illumination system in FIG. 1A-1E. FIGS. 6A and 6B serve to illustrate the method of providing an illumination device according to the present invention, and this method is slightly different from the method illustrated in FIG. 2A-2D. FIG. 3A illustrates the illumination system 101 prior to arranging the support part 121 at the PCB 119, and FIG. 6B illustrates the illumination system when the support part 121 has been arranged at the PCB 119.

FIG. 6A illustrates that prior to arranging the rod support part at the PCB the optical light mixing rod 101 has been arranged in the rod support part and that the separate pressure part 137 has been arranged at and interlocks with the support part in a similar way as described in connection with FIG. 2A-D.

FIG. 6B illustrates that when the assembled rod holder have been provided the rod holder is arranged at the PCB and that this step also applies a pressure force to the optical light mixing rod, where the pressure force is adapted to press the entrance surface towards and the emitting window together. The pressure knobs 139 prevent the optical light mixer to be pushed upwards and the pressure force pressing the entrance surface towards the emitting window is thus provided. However, in FIG. 6B the pressing force is illustrated as a window pressing force 651, pressing the emitting window 105 towards the entrance surface 111 and the skilled person realizes that the pressing force and window pressing force are equivalent but opposite directed.

Alternatively to using a snap mechanism to interlock the pressing part and the rod support part the two part can be interlocked using any other fastening mechanism, such as screws, glue or for instance by providing threads at the outside of the support part and inside the pressing part such that the pressing part can be screwed onto the support part.

Figures 7A, 7B, 7C:
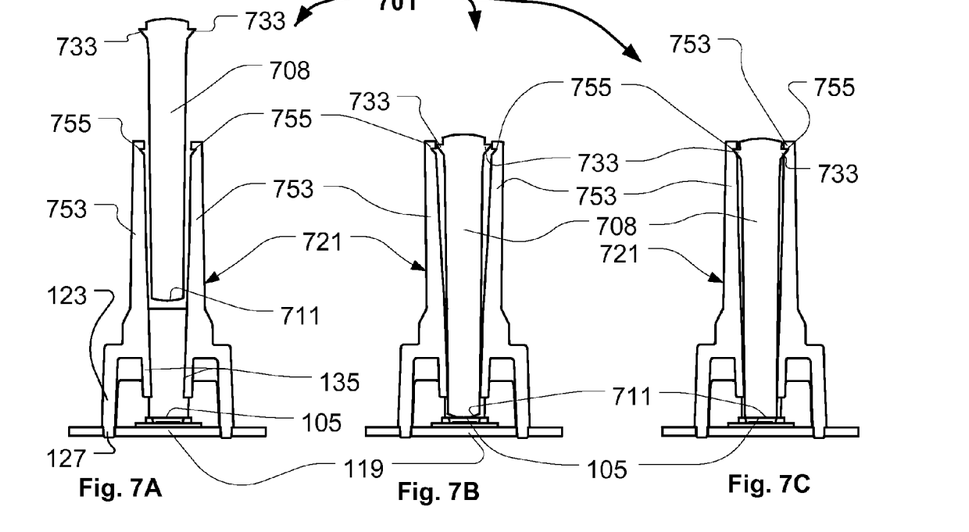
FIGS. 7A-7C illustrate cross sections views of another embodiment of an illumination system according to the present invention.

FIG. 7A-7C illustrate cross sectional views of another illumination system 701 according to the present invention, where FIG. 7A, illustrates the illumination system prior to arranging the optical light mixing rod in the rod support part, FIG. 7B illustrates the illumination system prior to providing the pressure force to the optical light mixing rod and FIG. 7C illustrates the illumination system in the final state where the pressure force has been provided to the optical light mixing rod. The illumination system 701 are like the illumination systems described in the previous figures and like features are labeled with the same reference numbers and will not be described here.

In this embodiment, the rod support part 721 comprises a positive number of resilient locking fingers 753 extending in an upward direction when the support part is arranged at the PCB. The resilient locking fingers 753 form a hollow part wherein the optical light mixing rod 708 can be inserted, for instance by arranging the resilient locking fingers 753 equally around the hole where the optical light mixing rod is arranged. The resilient fingers comprise a locking edges 755 formed as a recess, and the locking edges 755 is adapted to accommodate the flanges 733 of the optical light mixing rod 708. In this embodiment, the entrance surface of the optical light mixing rod is formed as a bulge as described in connection with FIG. 4-5; however it is noticed that the entrance surface also can be embodied as a flat entrance surface. As illustrated in FIG. 7B, the flanges 733 have been adapted to force the locking fingers outwards from their neutral state when the optical light mixing rod is inserted into the rod support part. This can for instance be achieved by providing the flanges 733 with an outward inclining lower surface. In FIG. 7B, the optical light mixing rod is arranged in the rod support part 721 such that the entrance surface 711 rests on the emitting window 105 of the light source, as can be seen, the flanges do not interlock with the locking edges 755 of the resilient locking fingers. The optical light mixing rod is then pushed downwards until the flanges 733 interlocks with the locking edges and the resilient fingers 753 returns towards there neutral states and interlocks with the flanges 733. When pushing the mixing rod downwards, a pressing force (not illustrated) that presses the entrance surface towards the emitting window is provided to the optical light mixing rod and as can be seen in FIG. 7C the bulged entrance surface 711 is pressed flat against the emitting window 105.

In one embodiment, the upper surface of the flanges 733 is adapted to decline outwards, whereby the resilient fingers will provide a pressing force to the optical light mixing rod, as the locking edge will force the flanges 733 downwards due to the resilient force in the resilient fingers.

It is noted that the locking edge of the resilient fingers can also engage the exit surface of the optical light mixing rod and provide the pressing force to the exit surface. The locking edge can for instance be adapted to engage with the outer most parts of the exit surface.

The locking edges have been illustrated as recesses in the resilient fingers, however it is to be understood that the locking edges also can be formed as protrusions from the resilient fingers.

Figure 8A:
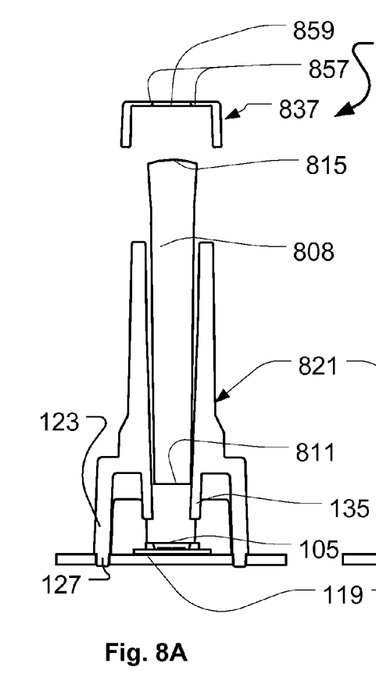
FIGS. 8A-8C illustrate cross sections views of another embodiment of an illumination system according to the present invention.
Figures 8B, 8C:
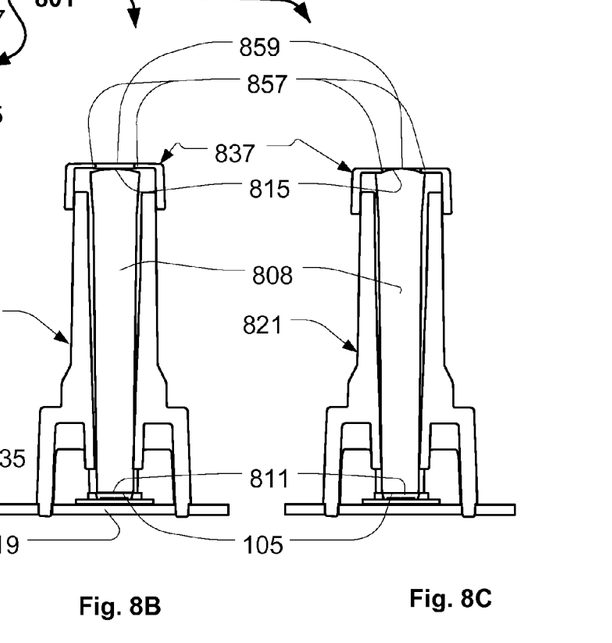

FIGS. 8A-8C illustrate cross sectional views of another illumination system 801 according to the present invention, where FIG. 8A illustrates the illumination system prior to arranging the optical light mixing rod in the rod support part 821, FIG. 8B illustrates the illumination system prior to providing the pressure force to the optical light mixing rod and FIG. 8C illustrates the illumination system in the final state where the pressure force has been provided to the optical light mixing rod. The illumination system 801 are like the illumination systems described in the previous figures and like features are labeled with the same reference numbers and will not be described here.

In this embodiment, the optical light mixing rod have been provided without flanges and with a flat entrance surface 811, however the entrance surface can also be bulged as described in connection with FIGS. 4-5. In FIG. 8B, the optical light mixing rod 808 is arranged in the rod support part 821 such that the entrance surface 811 rests on the emitting window 105 of the light source. Further, a pressing part 837 is adapted to interlock with the rod support part and to provide pressure force to the optical light mixing rod is provided. The separate pressure part 837 comprises at least one pressure edge 857 adapted to provide pressure to the exit surface 815 of the optical light mixing rod, when the separate pressure part interlocks with the rod support part. In this embodiment, the pressure edge 857 is formed by the outer edge of an aperture 859 in the top of the separate pressure part. The aperture is formed such that its diameter is smaller than the diameter of the exit surface 815. However, it is noticed that the pressure edges also can be formed as a number of protrusions extending into the aperture where the aperture is larger than the entrance surface. This makes it possible to reduce the area of the front lens covered by the pressure edges 857.

In FIG. 8B, the separate pressure part 837 is arranged just above the optical light emitting rod and the pressure edge 857 does not provide pressure to the exit surface 815. FIG. 8C illustrates the illumination system in an interlocked setting where the separate pressure part has been arranged in a position where it interlocks with the rod support part 821, for instance by the use of snapping means, screwing means or other fastening means. In this setting, the pressure edge 857 pushes the outer part of the exit surface downward and as a result provides a pressure force adapted to press the entrance surface 811 towards the emitting window. The central part of the exit surface will be arranged in the aperture and the light can thus exit through the exit surface and the aperture.

Figure 9A:
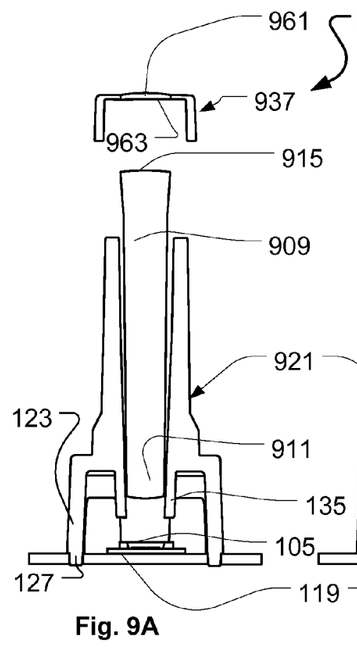
FIGS. 9A-9C illustrate cross sections views of another embodiment of an illumination system according to the present invention.
Figures 9B, 9C:
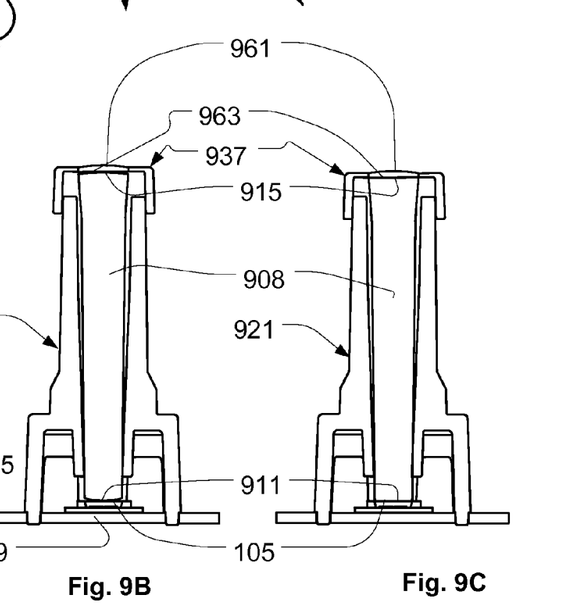

FIGS. 9A-9C illustrate cross sectional views of another illumination system 901 according to the present invention, where FIG. 9A illustrates the illumination system prior to arranging the optical light mixing rod in the rod support part, FIG. 9B illustrates the illumination system prior to providing the pressure force to the optical light mixing rod and FIG. 9C illustrates the illumination system in the final state where the pressure force has been provided to the optical light mixing rod. The illumination system 901 are like the illumination systems described in the previous figures and like features are labeled with the same reference numbers and will not be described here.

In this embodiment, the optical light mixing rod have been provided without flanges and with a bulged entrance surface 911 however the entrance surface 911 can also be flat. In FIG. 9B, the optical light mixing rod 908 is arranged in the rod support part 921 such that the entrance surface 911 rests on the emitting window 105 of the light source. Further, a pressing part 937 adapted to interlock with the rod support part and to provide pressure force to the optical light mixing rod is provided. The separate pressure part 937 comprises a pressing optical component 961 such as a lens, diffuser, filter, transparent plate provided in the top of the separate pressure part. The pressing optical component 961 is adapted to provide pressure to the exit surface 915 of the optical light mixing rod when the separate pressure part interlocks with the rod support part.

In FIG. 9B, the separate pressure part 937 is arranged just above the optical light emitting rod and the pressing optical component 961 does not provide pressure to the exit surface 915. FIG. 9C illustrates the illumination system in an interlocked setting where the separate pressure part has been arranged in a position where it interlocks with the rod support part 921 for instance by the use of snapping means, screwing means or other fastening means. In this setting, the lower surface 963 of the pressing optical component pushes the exit surface 915 downward and as a result provides a pressure force adapted to press the entrance surface 911 towards the emitting window. In FIG. 9C, the introduced pressure force provided is adapted to press the bulged entrance surface 911 flat against the emitting window 105. Further, the pressure force is adapted to press the exit surface into a shape of the lower surface 963 of the optical component. In the illustrated embodiment, the lower surface 963 of the pressing optical component 961 is flat and the exit surface 915 of the optical light mixing rod it thus forced flat. This embodiment makes it possible to provide an optical light mixing rod between the light source and a pressing optical component and ensures a good transition of light between the different components in the system, as the transition surfaces between the components can be pressed together, whereby the amount of back reflected light due to the transitions is reduced. The pressing optical component can be formed in a harder material than the optical light mixing rod and whereby it is the entrance surface of the optical light mixing rod that is formed to the shape of the pressing component.

Figure 10A:
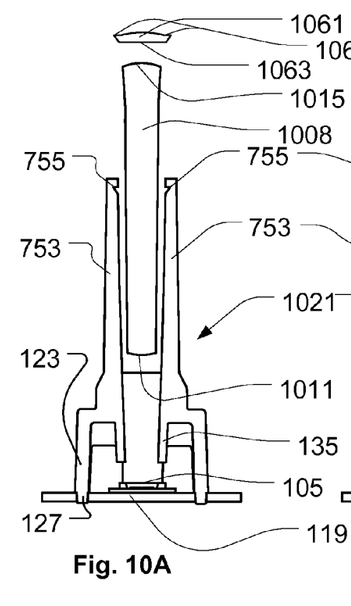
FIGS. 10A-10C illustrate cross sections views of another embodiment of an illumination system according to the present invention.
Figures 10B, 10C:
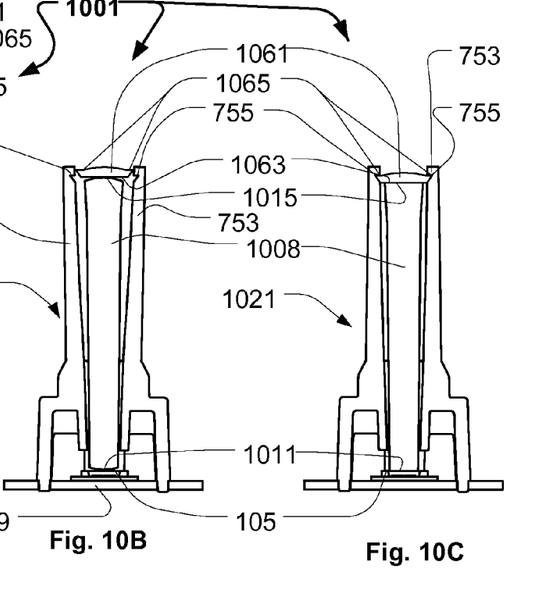

FIGS. 10A-10C illustrate cross sectional views of another illumination system 1001 according to the present invention, where FIG. 10A illustrates the illumination system prior to arranging the optical light mixing rod in the rod support part, FIG. 10B illustrates the illumination system prior to providing the pressure force to the optical light mixing rod and FIG. 10C illustrates the illumination system in the final state where the pressure force has been provided to the optical light mixing rod. The illumination system 1001 are like the illumination systems described in the previous figures and like features are labeled with the same reference numbers and will not be described here.

Like the illumination system in FIG. 7A-7C, the rod support part 1021 comprises a positive number of resilient locking fingers 753 extending in an upward direction when the support part is arranged at the PCB and the resilient fingers comprises locking edges 755.

The illumination device comprises a pressing optical component 1061 such as a lens, diffuser, optical filter, transparent plate, gobo shapes etc. In the illustrated embodiment, the pressing optical component 1061 is embodied as a transparent lens comprising a locking edge 1065. The pressing optical component can for instance be molded where the locking edge 1065 is formed at the outer part of the optical lens. The locking edge 1065 is adapted to force the locking fingers 753 outwards from their neutral state when the pressing optical component is inserted into the rod support part, as illustrated in FIG. 10B. This can for instance be achieved by providing the locking edge 1065 with an outward inclining lower surface. In FIG. 10B, the optical light mixing rod 1008 is arranged in the rod support part 1021 such that the entrance surface 1011 rests on the emitting window 105 of the light source. In FIG. 10B, the locking edge of the pressing optical component does not interlock with the locking edge 1055 of the resilient fingers 753 and the pressing optical component does not provide pressing force to the optical light mixing rod.

The pressing optical component 1061 is then pushed downwards until the locking edges of the pressing optical component interlocks with the locking edges 755 and the resilient fingers 753 returns towards there neutral states and interlocks with the locking edges 755 of the optical component. When pushing the pressing optical component downwards, a pressing force presses the lower surface of the pressing optical component towards the exit surface 1015 of the optical light mixing rod and the entrance surface 1011 is also pushed towards the emitting window. In FIG. 10C, the bulged entrance surface 1011 is pressed flat against the emitting window 105, and the curved exit surface 1015 is pressed flat against the lower surface of the pressing optical component 1061. As a consequence, good contact is provided between the transitions surfaces of the optical components as the flexible optical light mixing rod is arranged in a tense state between the light emitting window and the pressing optical component.

Alternatively, it is possible to arrange the pressing optical component in a holder part comprising locking edges adapted to interlock with the resilient fingers and then arranged the holder part in the support part in a similar way as described above.

In general it is noticed that at least some of the embodiments shown in the present application shown exemplary embodiments serves to illustrate the principles of the invention, rather than showing exact solutions. Further it is noticed that the skilled person will be able to combine two or more of the shown embodiments in any way and that further components and features can be provided.

It is also noticed that the illumination system can comprise a plurality of light sources, where the rod holder can be adapted to fix a plurality of the optical light mixing rods in a position, where the entrance surface of each optical light mixing rod is arranged above a emitting window of a corresponding light sources. The rod holder can also comprise a pressure mechanism adapted to provide pressure force to each of the optical light mixing rod and light source pairs.

What is claimed is:

1. An illumination system comprising:
    at least one light source being configured to emit light from an emitting window;
    an optical light mixing rod being formed of a solid transparent material and comprising an entrance surface, side surfaces and an exit surface, wherein light from the at least one light source enters the optical light mixing rod through the entrance surface and is transmitted through the optical light mixing rod via reflections at the side surfaces and exits the optical light mixing rod through the exit surface; and
    a rod holder being adapted to fix the optical light mixing rod in a position, wherein the entrance surface is arranged above the emitting window;
    wherein the optical light mixing rod is formed in a flexible and solid transparent material and in that the rod holder is adapted to arrange the entrance surface in contact with the emitting window and in that the rod holder comprises a pressure mechanism adapted to provide a pressure force to the optical light mixing rod, the pressure force is adapted to press the entrance surface and the emitting window together and wherein the entrance surface comprises at least one bulge having an increasing thickness that contacts the emitting window when the pressure mechanism provides the pressure force to the optical light mixing rod.

2. The illumination system of claim 1 wherein a thickness of the at least one bulge increases from the side surfaces of the optical light mixing rod and towards a center of the entrance surface.

3. The illumination system of claim 1 wherein the pressure force is adapted to force the at least one bulge flat against the emitting window.

4. The illumination system of claim 1 wherein a hardness of the flexible and solid transparent material is less than 95 on a Shore A durometer scale.

5. The illumination system of claim 1 wherein a hardness of the flexible and solid transparent material is greater than 65 on a Shore A durometer scale.

6. The illumination system of claim 1 wherein the flexible and solid transparent material comprises silicone.

7. The illumination system of claim 1 wherein the pressing mechanism comprises a pressing optical component adapted to provide the pressure force to the optical light mixing rod by pressing the pressing optical component towards the exit surface of the optical light mixing rod.

8. The illumination system of claim 1 wherein the rod holder comprises:
    a rod support part arranged near the at least one light source, the rod support part being further adapted to accommodate and support the optical light mixing rod in a position where at least a portion of the entrance surface of the optical light mixing rod rests on the emitting window of the at least one light source; and
    a separate pressure part adapted to engage the rod support part in a interlocked position, wherein the separate pressure part in the interlocked position is adapted to engage at least a portion of the optical light mixing rod and to provide the pressure force to the optical light mixing rod.

9. The illumination system of claim 8 wherein the optical light mixing rod comprises a rod engaging device protruding from the side surfaces and wherein the separate pressure part is adapted to press the rod engaging device towards the light emitting window.

10. The illumination system of claim 8 wherein the separate pressure part comprises a pressing optical component.

11. The illumination system of claim 9 wherein the rod support part comprises a first engaging part and wherein the separate pressure part comprises a second engaging part, and in the interlocked position, the first engaging part is adapted to interlock with the second engaging part.

12. A method of providing an illumination system, the method comprising:
    providing at least one light source that emits light from an emitting window;
    providing an optical light mixing rod that is formed of a flexible solid transparent material, the optical light emitting rod comprises an entrance surface, side surfaces, and an exit surface, wherein the entrance surface comprises a bulge having an increasing thickness;
    arranging the optical light mixing rod above the at least one light source such that the light from the at least one light source enters the optical light mixing rod through the entrance surface and is transmitted through the optical light mixing rod via reflections at the side surfaces and exits the optical light mixing rod through the exit surface; and
    applying a pressure force to the optical light mixing rod, where the pressure force is adapted to press the entrance surface and the emitting window together and to force the bulge flat against the emitting window.

13. The method of claim 12 wherein arranging the optical light mixing rod comprises arranging the optical light mixing rod in a rod support part and wherein applying the pressure force to the optical light mixing rod comprises arranging a separate pressure part in an interlocking position at the rod support part.

14. The method of claim 13 wherein providing the pressure force to the optical light mixing rod comprises:
    arranging a pressing optical component above the exit surface of the optical light mixing rod; and
    applying top pressure force to the optical component, where the top pressure force is adapted to press the pressing optical component and the exit surface together.

15. An illumination system comprising:
    at least one light source being adapted to emit light from an emitting window;
    an optical light mixing rod being formed of a solid transparent material and comprising an entrance surface, side surfaces and an exit surface, wherein the light from the at least one light source enters the optical light mixing rod through the entrance surface and is transmitted through the optical light mixing rod via reflections at the side surfaces and exits the optical light mixing rod through the exit surface; and
    a rod holder being adapted to fix the optical light mixing rod in a position, where the entrance surface is arranged above the emitting window;

wherein the optical light mixing rod is formed in a flexible and solid transparent material and in that the rod holder is adapted to arrange the entrance surface in contact with the emitting window and in that the rod holder comprises a pressure mechanism adapted to provide a pressure force to the optical light mixing rod, the pressure force is adapted to press the entrance surface and the emitting window together and wherein the entrance surface comprises at least one bulge that includes a thickness that is greater than a thickness of a center of the entrance surface.

16. The illumination system of claim 15 wherein the rod holder comprises:
a rod support part arranged near the at least one light source, the rod support part being further adapted to accommodate and support the optical light mixing rod in a position where at least a portion of the entrance surface of the optical light mixing rod rests on the emitting window of the at least one light source.

17. The illumination system of claim 16 wherein the rod holder further comprises a separate pressure part adapted to engage the rod support part in a interlocked position, wherein the separate pressure part in the interlocked position is adapted to engage with at least a portion of optical light mixing rod and to provide the pressure force to the optical light mixing rod.

18. The illumination system of claim 17 wherein the optical light mixing rod comprises a rod engaging device protruding from the side surfaces and wherein the separate pressure part comprises pressure part is adapted to press the rod engaging device towards the emitting window.

19. The illumination system of claim 17 wherein the separate pressure part comprises a pressing optical component.

20. The illumination system of claim 19 wherein the rod support part comprises a first engaging part and wherein the separate pressure part comprises a second engaging part and in the interlocked position, the first engaging part is adapted to interlock with the second engaging part.

* * * * *